April 12, 1966  C. B. BLAIR  3,245,714
EXPANDABLE TRUCK BED
Filed March 15, 1965  3 Sheets-Sheet 1

INVENTOR.
CALVIN B. BLAIR
BY
Fishburn and Holt
ATTORNEYS

April 12, 1966  C. B. BLAIR  3,245,714
EXPANDABLE TRUCK BED
Filed March 15, 1965  3 Sheets-Sheet 2

INVENTOR.
CALVIN B. BLAIR
BY
Fishburn and Gold
ATTORNEYS

April 12, 1966  C. B. BLAIR  3,245,714
EXPANDABLE TRUCK BED
Filed March 15, 1965  3 Sheets-Sheet 3
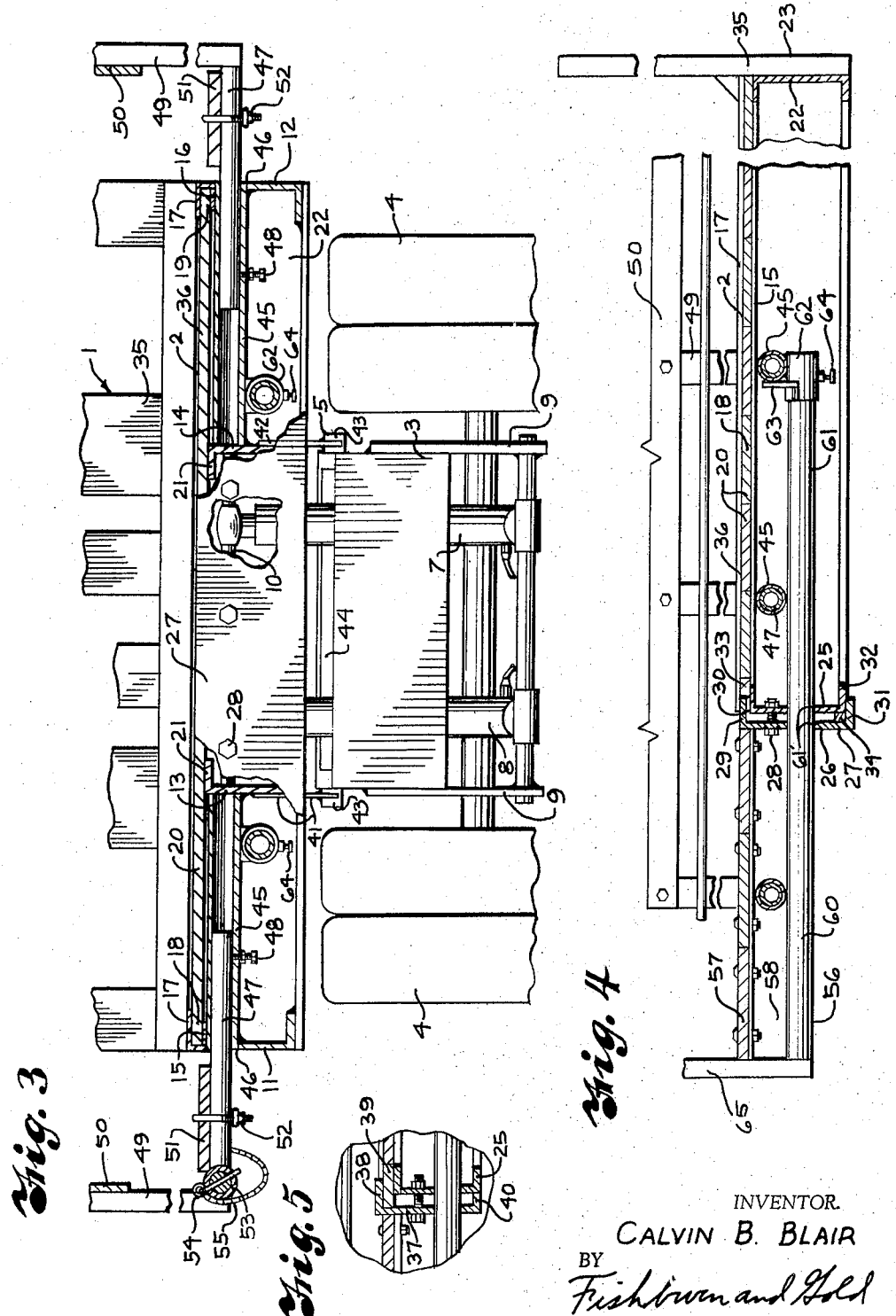
INVENTOR.
CALVIN B. BLAIR
BY
Fishburn and Gold
ATTORNEYS

United States Patent Office 3,245,714
Patented Apr. 12, 1966

3,245,714
EXPANDABLE TRUCK BED
Calvin B. Blair, Box 76, Barnard, Kans.
Filed Mar. 15, 1965, Ser. No. 439,678
4 Claims. (Cl. 296—26)

This application is a continuation-in-part of my copending United States application, Serial No. 246,513, now Patent No. 3,183,657, June 1, 1965, entitled "Self Loading and Unloading Vehicle." This invention relates to wagon or truck beds and the like and more particularly to such beds which are expandable.

The principal objects of the present invention are: to provide a wagon or truck bed which is easily expandable and retractable in length and width so as to selectively maintain legal size over-the-road hauling and efficiently haul light weight, bulky loads in the field; to provide such a bed requiring no nails, bolts or other fastening devices between floor planks to secure a grain-tight easily repairable floor; to provide such a vehicle bed wherein the floor planks are easily compressed together to compensate for variations in plank dimensions due to drying and other causes; to provide such a bed having sideboard structure which may be easily removed and replaced; and to provide such a bed which is simple and inexpensive in construction, relatively light in weight, and yet rugged and easily maintained in use.

Other objects and advantages of this invention will become apparent from the following description taken in connection with the accompanying drawings wherein are set forth by way if illustration and example certain embodiments of this invention.

FIG. 3 is a cross-sectional view through the wagon taken on the line 3—3, FIG. 2, on an enlarged scale, further showing the expandable sideboard mounting structure.

FIG. 4 is a cross-sectional view through the wagon taken on the line 4—4, FIG. 2, on an enlarged scale, further showing the mounting structure for the front gate extension and a compressing structure for the floor planks.

FIG. 5 is a fragmentary cross-sectional view through the bed, on an enlarged scale, showing a modified form of floor plank compressing structure.

Figure 1:
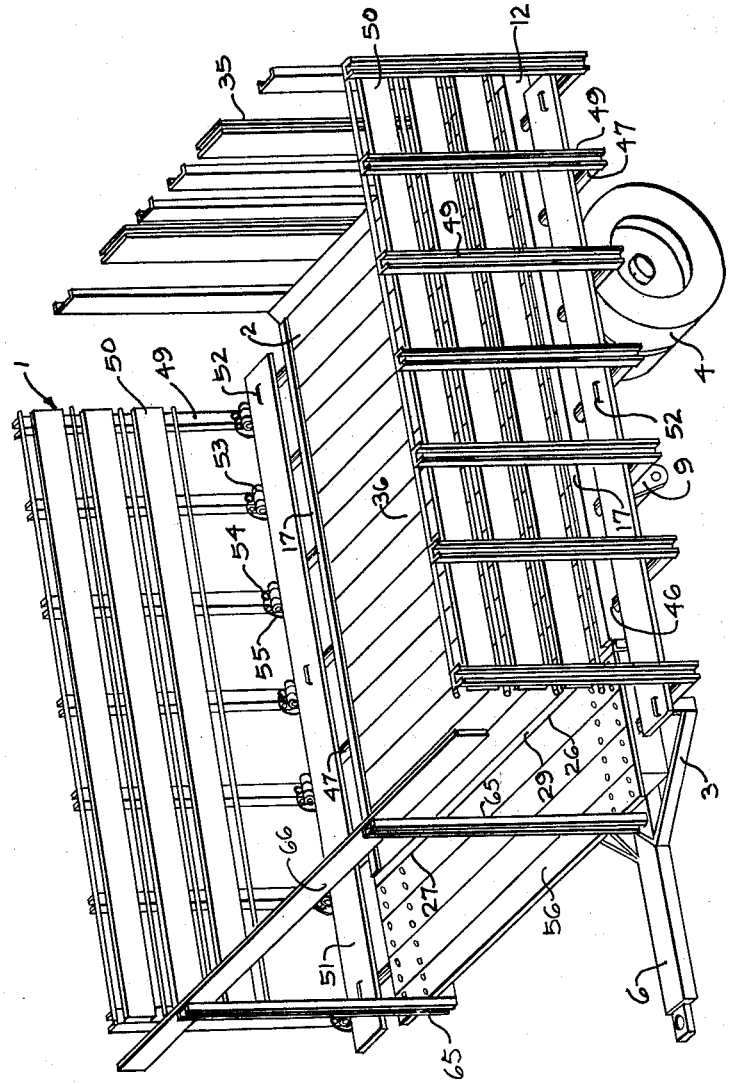
FIG. 1 is a perspective view of a wagon embodying this invention particularly illustrating expandable sideboard structure and a front gate extension cooperating with the bed.
Figure 2:
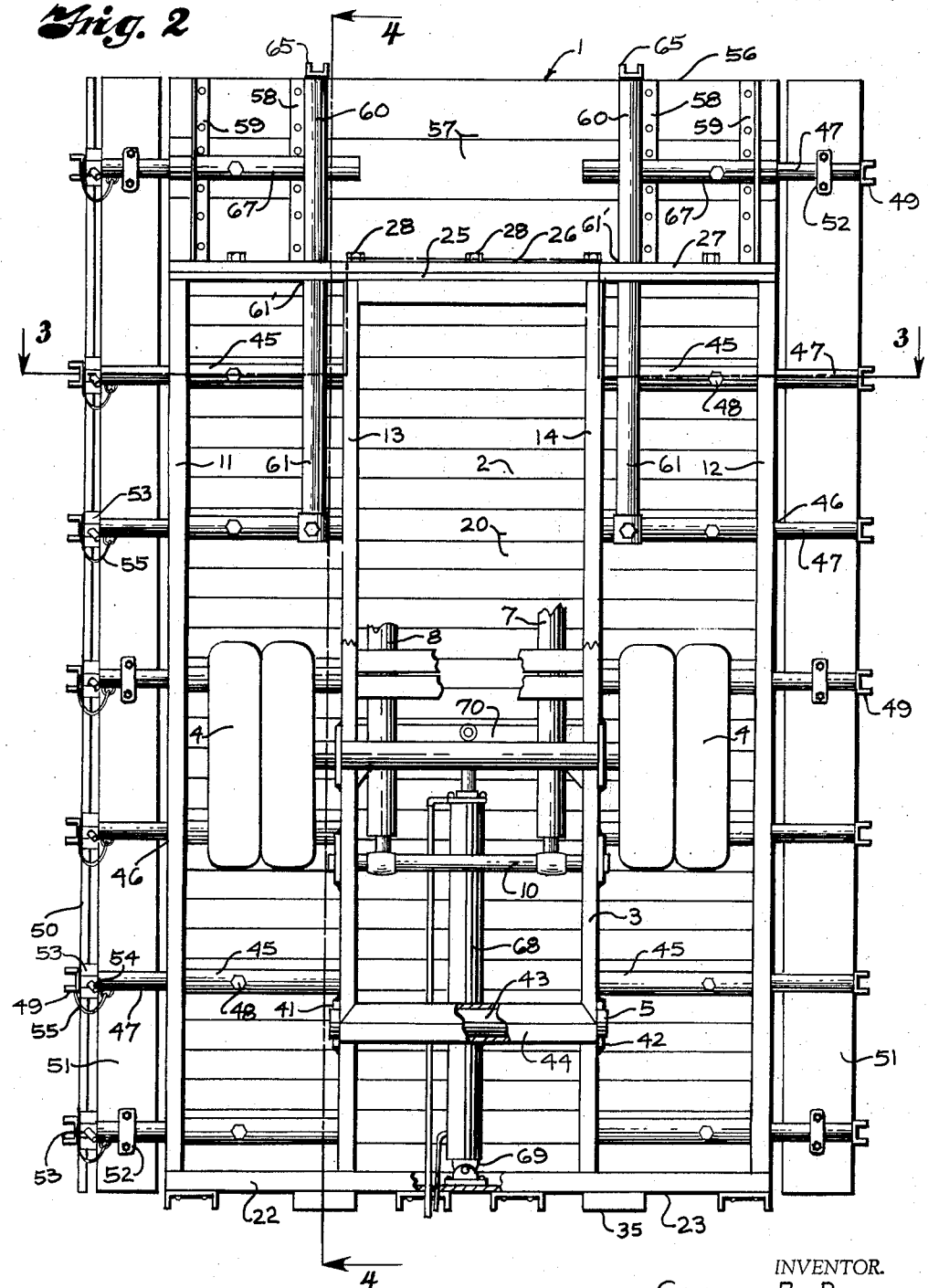
FIG. 2 is a plan view with parts broken away showing the underside of the wagon and particularly illustrating structure for supporting the expandable sideboards and front gate extension.

Referring to the drawings in more detail:

The reference numeral 1 generally indicates a wagon embodying this invention. The wagon 1 comprises a bed broadly designated 2 mounted on a frame 3 preferably having dual wheels 4. The bed 2 is normally supported by the frame 3 spaced above the ground and a pivotal connection 5 between the bed 2 and frame 3 permits the bed to pivot from a horizontal to a vertical position if desired for loading or unloading. The frame 3 has a forwardly extending coupling member 6 of any suitable type, but preferably of the type designed for rapid engagement with standard hitches for connection to suitable pulling equipment, for example, a farm tractor (not shown). It is to be understood, however, that the wagon apparatus described herein is suitable for relatively high speed over-the-road hauling, in which case a truck tractor may be used as the pulling equipment.

Laterally spaced parallel extensible hydraulic bed pivoting cylinders 7 and 8 are pivotally connected at opposite ends thereof respectively to depending lugs 9 fixed to the frame 3 and to a rigid crossbar 10 welded to the bed 2. The cylinders 7 and 8 may be remotely controlled from the pulling equipment (not shown) and are extensible to a length for pivoting of the bed 2 from the horizontal position illustrated in FIG. 1 to a position (not shown) wherein the bed is substantially vertical.

Specifically referring to the construction of the bed 2, elongated longitudinally extending spaced apart outer channels 11 and 12 form the exterior sides of the bed and lend structural strength thereto. Spaced apart inner structural channel members 13 and 14 also extend longitudinally of the bed and are located in flange facing position between the outer channels 11 and 12. Elongated strips 15 and 16 are secured, as by welding, respectively to the outer channels 11 and 12 and run parallel to and beneath the upper flanges 17 thereof forming inwardly facing elongated open pockets or troughs 18 and 19 for receiving the opposite ends of transversely extending floor boards 20 in longitudinal edge contacting relation. Upper surfaces of upper flanges 21 on the inner channels 13 and 14 are located in vertical alignment or elevation with the strips 15 and 16 whereby the floor boards 20 rest in level fashion on the inner channels 13 and 14, the boards 20 being retained against upward displacement by the outer channel upper flanges 17.

A cross channel 22 extends transversely of the bed 2 and is suitably secured, preferably by welding, to one end of the channels 11, 12, 13 and 14 at the rear 23 of the bed. A cross channel 25 extends transversely of the bed 2 across the bed front 26 and is suitably secured, preferably by welding, to the opposite end of the channels 11, 12, 13 and 14. A cross channel 27 extends transversely of the bed 2 generally in front of and adjacent the channel 25 and is adjustably secured to the channel 25 by means of spaced apart bolts 28 extending transversely therethrough. The upper flange 29 of the channel 27 extends rearwardly into the pockets or troughs 18 and 19 at the open forward ends 30 thereof and the lower flange 31 of the channel 27 is positioned to telescope over the bottom flange 32 of the channel 25. A floor board or strip 33 is placed in the pockets or troughs 18 and 19 in contact with the end of the upper flange 29 and, if required, a suitable insert or spacer 34 is placed between the channel 27 and the lower web portion of the channel 25 to prevent the channel 27 from excessively tilting or cocking as the bolts 28 are tightened. By tightening the bolts 28, transverse pressure is applied to the floor boards 20 which are prevented from moving relative to the bed by abutting against the rear gate 35. The respective floor board side edges are thus tightly abutted together which produces a grain-tight floor 36. If the floor boards 20 loosen up, for example, due to drying out, it is only necessary to replace the floor board or strip 33 and possibly the spacer 34 with one of appropriate width in order to take up the slack produced. It is a simple matter to replace a broken or otherwise damaged floor board by removing the channel 27 and sliding out the floor boards until the damaged one is removed and then filling the space with an undamaged board. Note that no individual fasteners are required for the respective floor boards.

If desired, certain modifications may be made in the floor board retaining and compressing structure described above, for example, those illustrated in FIG. 5 wherein the channel 37, corresponding to the channel 27 of FIG. 4, has the upper flange 38 thereof telescoping over the top surface of the board or strip 39 rather than abutting thereagainst and the web of the channel 37 contacts the end of the board or strip. Also, if desired, the lower flange 40 of the channel 37 may abut against the lower web portion of the channel 25 rather than telescoping over the lower flange, whereupon a spacer such as the spacer 34 illustrated in FIG. 4, may not be required.

Spaced apart bed supporting ears 41 and 42 are welded to the inner channels 13 and 14 and depend therefrom. The ears 41 and 42 are welded to a transverse shaft 43 rotatably mounted in a sleeve 44 fixed to the frame 3. The ears 41 and 42, shaft 43 and sleeve 44 form the pivotal connection 5 noted have above between the bed and frame.

Parallel transversely extending spaced apart pipes or tubes 45 are welded to and extend respectively between longitudinally extending channels 11 and 13 and between longitudinally extending channels 12 and 14. The tubes 45, in addition to their prime function described below, form spacing members between the respective channels and add structural strength to the bed 2. The outer channels 11 and 12 have suitable openings or bores 46 extending transversely through the webs thereof. The bores 46 having substantially the same inside diameter as the outside diameter of the tubes 45 and receive the tubes 45 thereinto to provide access from the outer sides of the bed into the tubes 45. Tubes 47 have an outside diameter slightly smaller than the inside diameter of the tubes 45 whereby the tubes 47 may be telescoped thereinto as best illustrated in FIG. 3. Set screws 48 extend through the tubes 45 and are adapted to adjustably engage the tubes 47 to maintain same in desired lateral extending positions with respect to the bed 2.

The tubes 47 are fixed to suitable vertically extending channels 49 which are secured in spaced relation to each other on side panel boards 50. Thus, when hauling light, bulky materials under conditions wherein it is not necessary to stay within legal over-the-road width limits, the effective width of the bed may be easily adjustably expanded to substantially greater size by merely releasing the set screws 48, telescoping the tubes 47 axially of the tubes 45 and subsequently tightening the set screws 48. When the sides are extended well beyond the outer channels 11 and 12, it is usually desirable to lay suitable auxiliary floor boards 51 on the tubes 47 to provide a supporting floor extension. Suitable easily removable fasteners 52 may be used to maintain the floor boards 51 in place.

For certain loading and unloading operations it is desirable to permit access to the bed 2 from the side. For this purpose a pivotal connection 53 is provided at the joint between the channels 49 and tubes 47 on one side of the bed whereby one side panel or portion may pivot outwardly and downwardly from its normal vertical position. Lock pins 54 are inserted in the respective pivotal connections 53 and are adapted for easy removal to permit the pivoting motion. Suitable retaining chains or lines 55 prevent the accidental loss of the pins 54.

If it is desired to extend the length of the bed 2, a bed extension assembly 56 is provided which comprises abutting transversely extending floor boards 57 secured to pairs of spaced apart longitudinally extending inner angles 58 and outer angles 59. The angles 58 are respectively fixed to spaced parallel longitudinally extending pipes or tubes 60 which extend rearwardly beyond the floor boards 57 a substantial distance at 61. The tubes 60 are received through suitable aligned openings or bores 61' in the front channel 27 and channel 25 and extend into collars 62 anchored to selected tubes 45 with brackets 63. Set screws 64 are threadedly engaged in the collars 62 for retaining the rearwardly extending portions 61 of the tubes 60 in the collars 62 against relative longitudinal motion.

The front channels 25 and 27 and collars 62 support the tubes 60 to maintain the floor boards 57 extending forwardly of and at the same level as the bed floor 36. Vertical extending forward angles 65 are suitably secured to the bed extension assembly 56 for supporting a railing 66 or suitable end panels as desired. The bed extension assembly 56 is easily removed by merely loosening the set screws 64 and withdrawing the tubes 60 from beneath the bed.

If desired, the side panel boards 50 may be extended forwardly past the bed front 26. Also, receiving tubes 67 may be mounted in transversely extending position on the bed extension assembly 56 beneath the floor boards 57 to telescopically receive forward side tubes 47 in the same manner as the bed tubes 45. It is apparent that if the illustrated extension provided by the extension assembly 56 is not desired, an end gate which extends upwardly from the bed front 26 may be selected for mounting in the same manner as the extension assembly 56.

An hydraulic cylinder 68 is anchored at one end 69 thereof the rear channel 22 and at the other end thereof to a sliding box structure 70 used in operating tail gate apparatus described in my co-pending application, Serial No. 246,513.

Although certain forms of this invention have been illustrated and described, it is not to be limited thereto except insofar as such limitations are included in the claims.

What I claim and desire to secure by Letters Patent is:
1. A rectangular vehicle bed having a front and a rear end and comprising:
(a) a frame including a pair of spaced apart longitudinally extending side members forming oppositely disposed pockets opening toward each other,
(b) transversely extending and transversely abutting floor boards having the opposite ends thereof slidably engaged respectively in said pockets forming a floor,
(c) an abutment at one end of said bed and engaging one of said boards preventing movement of said boards therepast longitudinally of said bed.
(d) transverse means at the other end of said bed and engaging one of said boards preventing movement of said boards therepast longitudinally of said bed, and means moveable longitudinally of said bed and engaging said transverse means and engaged with said frame for compressing said boards together longitudinally of said bed.
2. The bed as set forth in claim 1 wherein:
(a) said transverse means comprises a channel having a flange aligned with said pockets, said transverse means flange engaging said last named board.
3. The bed as set forth in claim 1 wherein:
(a) said transverse means comprises a channel having an upper flange telescoping over one of said boards and a web engageable with said last named board.
4. A laterally expandable rectangular vehicle bed comprising:
(a) parallel spaced apart elongated transversely horizontally extending receiving members fixed to said bed and opening at one side of said bed,
(b) parallel spaced apart support members telescopically received in said receiving members,
(c) side board structure secured to said support members and slidable laterally of said bed in response to the telescoping of said support members in said receiving members,
(d) locking means for securing said support members in desired position in said receiving members, and
(e) pivotal joints located between said side board structure and said support members for selectively pivotally lowering said side board structure.

References Cited by the Examiner
UNITED STATES PATENTS

| 1,366,771 | 1/1921 | Deveneenzi | 296—26 |
| 2,307,149 | 1/1943 | Milz. | |
| 2,442,889 | 6/1948 | Deal | 296—26 X |
| 2,704,223 | 3/1955 | Houdart | 296—26 |
| 2,729,499 | 1/1956 | Eggum | 296—26 |
| 3,058,770 | 10/1962 | Hutchinson. | |

BENJAMIN HERSH, *Primary Examiner.*